March 3, 1964
N. CORDIS
3,123,048
DEMOUNTABLE PADDLE-LINK CONVEYOR ASSEMBLY FOR STOCK FEEDERS OF THE CONTINUOUS TROUGH TYPE
Filed April 6, 1960
2 Sheets-Sheet 1
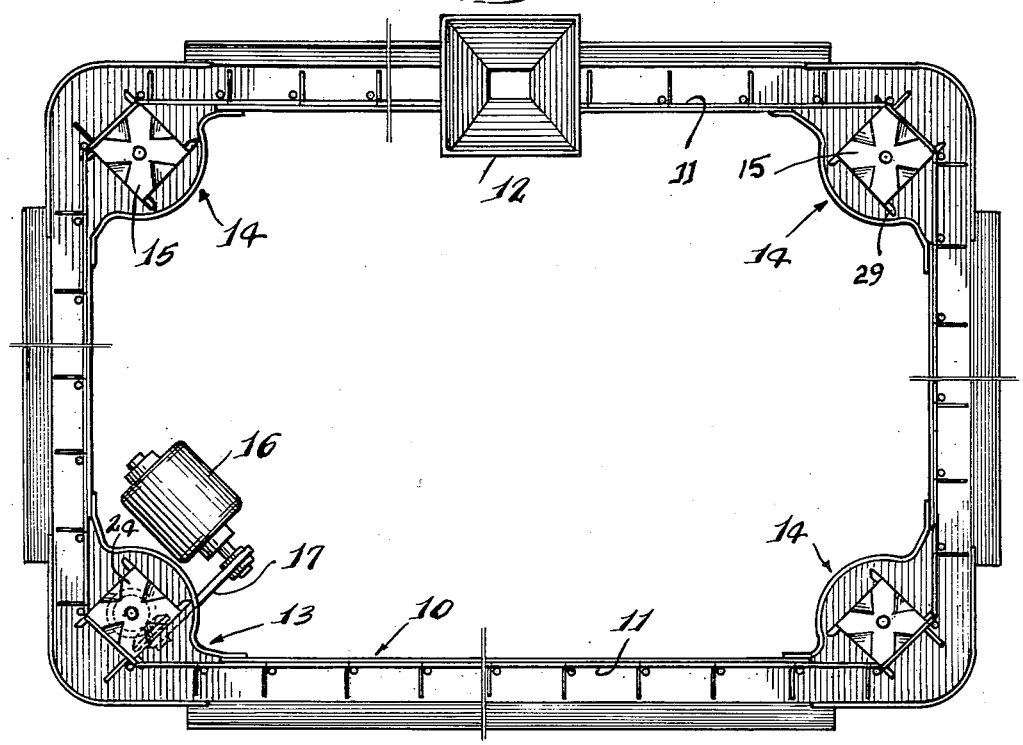
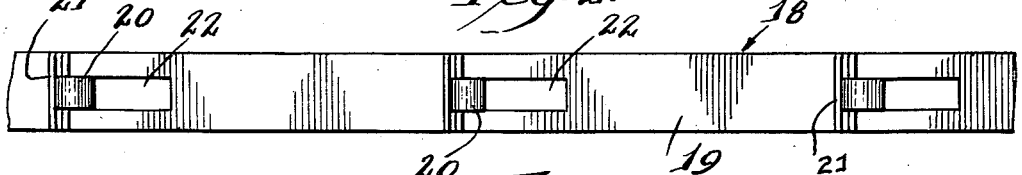
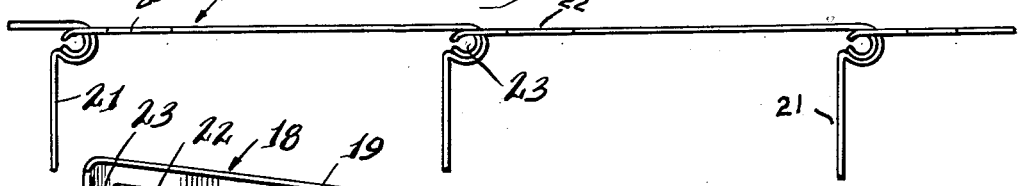
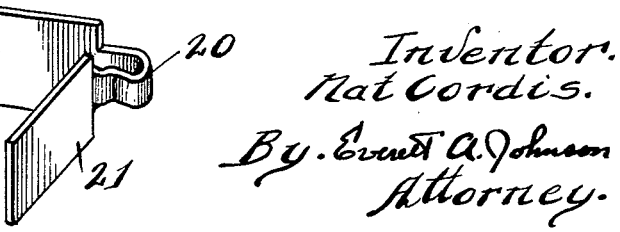
Inventor.
Nat Cordis.
By Everett A. Johnson
Attorney.

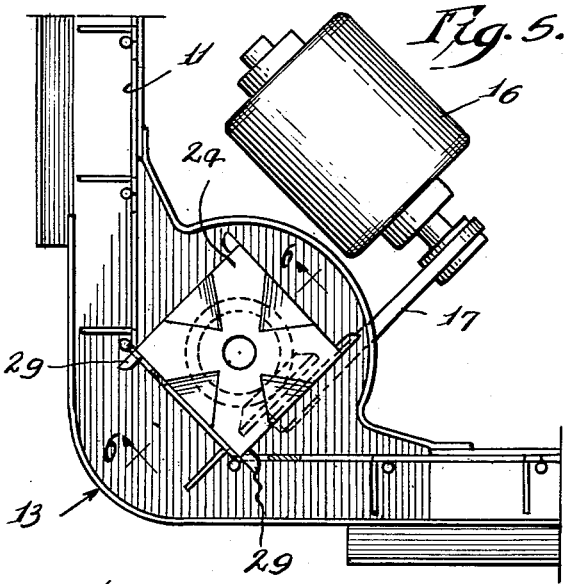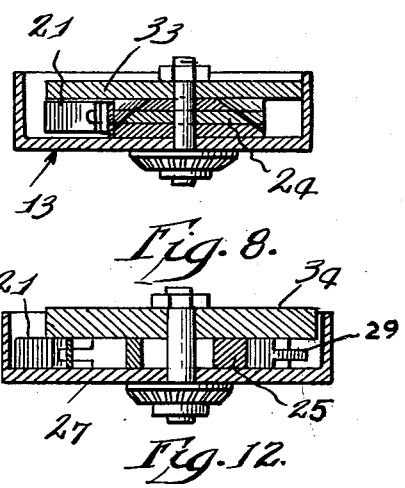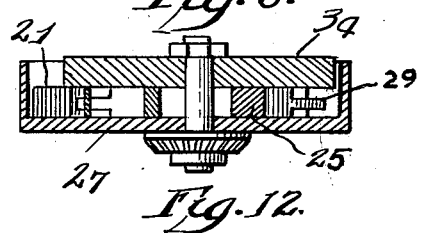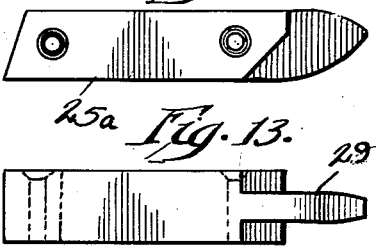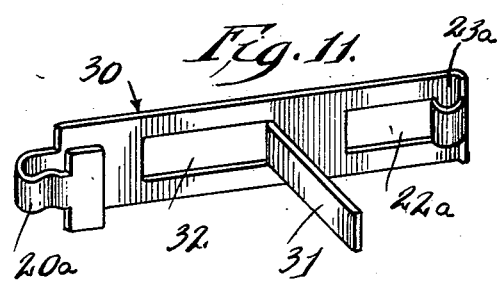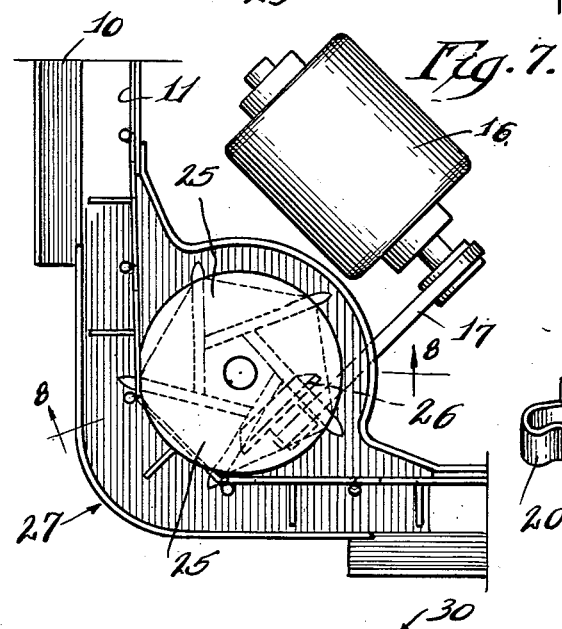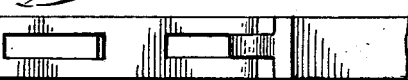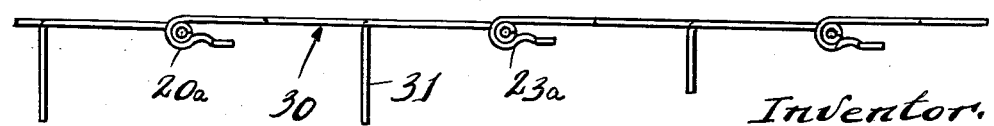

United States Patent Office 3,123,048
Patented Mar. 3, 1964

3,123,048
DEMOUNTABLE PADDLE-LINK CONVEYOR ASSEMBLY FOR STOCK FEEDERS OF THE CONTINUOUS TROUGH TYPE
Nat Cordis, Crown Farms, Silver Lake, Wis.
Filed Apr. 6, 1960, Ser. No. 20,290
6 Claims. (Cl. 119—52)

This invention relates to conveyors for flowable solid materials and, more particularly, to a feeding system for distributing pulverant materials from a bulk hopper along an open-topped trough which is accessible to stock including poultry. More specifically, the invention is an improvement in a system for automatically distributing feed from a jumbo hopper in a closed circuit trough-type poultry feeder.

The feeding of livestock such as poultry on a large scale necessarily involves the handling of large quantities of feed and heretofore considerable manual attention has been required to provide an adequate bulk supply for automatic feeders. Accordingly, a primary object of this invention is to provide a feeder of large capacity in which the feeding can be controlled with a minimum of attention by an operator. Another object is to provide a method and automatic means for uniformly distributing fresh feed from a large-capacity hopper within a continuous or closed circuit flock feeder. An additional object is to provide an automatic and controllable feeder which is of rugged and inexpensive construction. An important object of the invention is to provide an apparatus which maintains a continuously renewed supply of feed in a continuous trough while minimizing the possibility of accumulating stale feed along the path of the conveyor. A further object is to provide an apparatus which is readily expandable for various sizes of flocks of poultry, but which is also efficient for use in connection with relatively small flocks. A more specific object of the invention is to provide a flexible conveyor element which is of simple sturdy construction, is readily demountable, and is uniform in its feed carrying capacity.

An additional object of the invention is to provide a hopper construction which is of adjustable capacity. It is also an object of the invention to provide such a hopper which is adapted to discharge feed progressively, and with a minimum of attention, from a large bulk supply. These and other objects of the invention will become apparent to those skilled in the art as the description thereof proceeds.

Briefly, this invention provides improved poultry or stock feeders of the type wherein a feed conduit, comprising an open-topped horizontal trough, is arranged in communication with a feed supply hopper of unique design and wherein an endless articulated distributing means, comprising a demountable paddle-link chain, is moved longitudinally of the trough within a closed circuit.

The word "flights" as used hereinafter has reference to the straight lengths of trough and to the lengths of the demountable distributing member which runs within the same portion of the trough. At intersecting flights, idlers are provided for directing the conveyor. It is desired to change the direction of travel of the endless flexible demountable distributing member in the presence of a minimum feed. Accordingly, the feed supply hopper may be placed at any convenient point along the trough, but ordinarily will be placed over a flight just beyond a corner.

The distributing member provided for use in my improved feeder is a demountable paddle-link chain. The flat link includes laterally extending paddle portions which provide the feed carrying capacity of the distributor.

Details of my invention will be described by reference to particular embodiments thereof illustrated in the drawings FIGURES 2, 3 and 8 to 13 being drawn to an enlarged scale and wherein:

FIGURE 1 is a schematic plan view showing the general arrangement of closed circuit feeder embodying the principles of my invention;

FIGURES 2 and 3 are side and top views, respectively, formed according to the invention;

FIGURE 4 is a perspective of a paddle-link;

FIGURES 5 and 7 are plan views of preferred embodiments of the invention showing details of the drive corners;

FIGURE 6 is a section taken along the line 6—6 in FIGURE 5;

FIGURE 8 is a section taken along the line 8—8 in FIGURE 7;

FIGURES 9, 10 and 11 are side, top, and perspective views, respectively, of another embodiment of the paddle-link conveyor; and FIGURES 12 and 13 are top and side views of a sprocket component in FIGURE 7.

Referring to FIGURE 1, a stock feeder is shown having an open-topped trough 10, an endless articulated distributing or conveying member 11 running on the bottom of the trough 10, a supply hopper 12 from which feed discharges onto the member 11, drive means 13, and idler corners 14 for guiding the member 11 around the circuit. The idler corners 14 include idler corner pulley 15 which is of unique construction as shown. The drive unit 13 is driven by motor 16 through belt transmission 17. The hopper 12 may be of the construction shown in FIGURE 1 for example, and the drive unit 13 may be similar to that shown in FIGURES 5 and 7.

Referring to FIGURES 2, 3 and 4, the improved paddle links 18, each of which is formed of metal plate or strip stock, comprise a body 19, a shank 20, integral paddle 21, slot 22, and hook 23. By inserting paddle 21 through slot 22 and rotating a shank 20 about spring hook 23, the assembly of FIGURES 3 and 4 is obtained.

The demountable chain formed of the plate links 18 may be driven through a trough by a sprocket 24, as shown in FIGURES 1, 5 and 7. In this drive a tooth 29 enters the slot 22.

With reference to FIGURE 1, the illustrated embodiment of the invention comprises a trough 10 within which the conveyor 11 travels counter-clockwise, picking up feed from the hopper 12 and then in series through the idler corners 14 and the connecting flights of trough 10 by means of the drive unit 13, the flights of the trough 10 being in substantially the same plane.

The articulated conveying member 11 is driven on edge through the trough 10 by a drive corner 13 which comprises the drive sprocket 24 on shaft 24a driven by transmission gear 26, transmission pulley and belt 17, and pulley and motor 16.

As the drive sprocket 24 including drive teeth 29 is rotated, the teeth 29 enter the slots 22 in the conveyor 11 which is drawn over the sprocket 24, through the drive corner 13 and along the trough circuit including idler corners 14.

Referring to the idler corners 14, each comprises an idler pulley 15 which may be of the construction of pulleys 24 and 25 shown in FIGURES 5 and 7. The corners 14 include the pulley shaft 28, the housing 10a merging with adjacent flights of trough 10, and a cover plate 33, as shown in FIGURE 6.

In FIGURES 7 and 8, the drive sprocket or pulley 25 is provided with removable conveyor drive pins 25a (FIGURES 12 and 13) providing teeth 29 which engage the slots 22 as described above.

The drive corners 13 and 27 (FIGURES 5 and 6, and 7 and 8) may be provided with a cover 33 to serve as a corner hold-down for the conveyor 11 and to direct the feed and prevent build up.

In FIGURES 9, 10 and 11, the plate link 30 is provided with slot 22a, rolled pintle 23a, shank 20a, and a paddle 31 which is formed from the material removed from the additional slot 32. The shank 20 is curved as shown and snaps over pintle 23 after being passed through slot 22 and rotated into position.

The foregoing description has been with respect to a closed circuit system wherein three idler corners are associated with a single drive corner. It is contemplated, however, that the principles of design incorporated herein may be utilized in a trough which includes only a drive end a turnaround end.

Although my apparatus has been described in terms of particular embodiments thereof which have been set forth in considerable detail, it should be understood that this is by way of illustration only and that my invention is not limited thereto. Alternative constructions and operating techniques will become apparent to those skilled in the art in view of my disclosure and, accordingly, it is contemplated that modifications can be made without departing from the spirit of the described invention.

What I claim is:

1. A demountable conveyor assembly for use in poultry feeders comprising a plurality of interlocked plate links adapted to travel edge-wise within a poultry feeder trough, each link formed of a single body of flat material, a shank at one end of the body, a longitudinal slot in said body adjacent an end thereof said slot being adapted to receive means for driving said assembly in its edge-wise travel within such trough, a hook adjacent the end of said body, and a paddle carried by and extending transverse to the said body, said paddle having a length corresponding to the height of said edge-wise link and said slot having a length and width adapted to receive the paddle of an adjacent link.

2. A conveyor member formed from interlocking plate links adapted to run edge-wise that comprise a flat body portion, a slot in said body, a shank adjacent one end of said body, said shank being integral with and arranged transversely of said body to form a spring clip, a symmetrical terminal pintle adjacent said shank, said slot being adapted to receive such shank of an adjacent corresponding member, such clip resiliently engaging the pintle of the adjacent link, providing a continuous linked assembly with uniformly spaced transverse feed-engaging paddles, such paddles on adjacent links extending from one side of assembly.

3. In a poultry feeder of the type including an open-topped trough and an endless articulated conveyor operating therein to convey feed from a hopper, the improvement which comprises a bulk bin hopper astride a trough, an endless continuous demountable chain conveyor in said trough comprising a plurality of plate links in hinged array, said conveyor travelling adjacent a side wall of said trough, each link including a flat elongated body portion, a closed slot adjacent one end of said body, a pintle at one end of said slot consisting of an integral body portion of the stock removed in forming said slot, a shank on the other end of said body adapted to engage such pintle of an adjacent plate link, and a transverse conveying paddle carried by said body, such said paddle extending substantially the width of the trough from the same side of said array and inwardly of the side wall along which said conveyor travels.

4. A demountable conveyor assembly comprising a plurality of articulated plate links arranged edge-wise, each link being formed of a single elongated body of metal, a shank at one end of the body, a slot in said body adjacent the other end thereof, said slot being adapted to receive means for driving said conveyor, a pintle adjacent said slot and at the end of said body, and a paddle carried by said shank and transverse to the said body, said shank passing through such slot and engaging such pintle of an adjacent link.

5. A poultry feed conveyor member formed from interlocking plate links that comprise a flat body portion, a first slot in said body, a shank adjacent one end of said body, said shank being integral with and extending transversely of said body to form a spring clip, a symmetrical terminal pintle adjacent said shank, a second slot in said body intermediate the ends thereof, a feed-engaging paddle comprising the material removed from said second slot, such shank passing through such first slot and being clipped over the pintle of an adjacent link, providing a continuous linked conveyor member adapted to travel edge-wise with uniformly spaced transverse feed-engaging paddles.

6. In a poultry feeder of the type including an open-topped trough and an endless articulated conveyor operating therein to convey feed from a hopper, the improvement which comprises an endless continuous demountable chain conveyor in said trough comprising a plurality of elongated plate links adapted to travel edge-wise in hinged array, each link including a flat elongated body, a pintle at one end of said body consisting of an integral cylindrical portion of the body, a shank on the other end of said body adapted to resiliently engage such pintle of an adjacent link, and a conveying paddle carried by said body and integral therewith.

References Cited in the file of this patent

UNITED STATES PATENTS

| | | |
|---|---|---|
| 1,555,577 | Horner | Sept. 29, 1925 |
| 2,646,024 | Smallegan | July 21, 1953 |
| 2,683,439 | Markey | July 13, 1954 |
| 2,889,915 | McAuley | June 9, 1959 |